(12) United States Patent  
Vaver

(10) Patent No.: US 7,523,192 B2
(45) Date of Patent: Apr. 21, 2009

(54) AUTOMATED MODULE TRACKING SYSTEM FOR COMMUNICATIONS NETWORKS

(75) Inventor: Jon G. Vaver, Lafayette, CO (US)

(73) Assignee: Qwest Communications International Inc., Denver, CO (US)

( * ) Notice: Subject to any disclaimer, the term of this patent is extended or adjusted under 35 U.S.C. 154(b) by 1412 days.

(21) Appl. No.: 10/095,415

(22) Filed: Mar. 11, 2002

(65) Prior Publication Data

US 2003/0172152 A1 Sep. 11, 2003

(51) Int. Cl.
*G06F 15/173* (2006.01)
*G06F 15/16* (2006.01)
*G06F 11/30* (2006.01)
*G01R 31/28* (2006.01)

(52) U.S. Cl. .................. 709/224; 709/219; 714/25; 714/37; 702/183

(58) Field of Classification Search .................. None
See application file for complete search history.

(56) References Cited

U.S. PATENT DOCUMENTS

| | | | | |
|---|---|---|---|---|
| 4,578,773 A | * | 3/1986 | Desai et al. | 710/104 |
| 4,970,726 A | * | 11/1990 | Carn et al. | 714/25 |
| 6,148,335 A | * | 11/2000 | Haggard et al. | 709/224 |
| 6,684,349 B2 | * | 1/2004 | Gullo et al. | 714/47 |
| 6,868,428 B2 | * | 3/2005 | Todokoro et al. | 707/203 |
| 6,973,491 B1 | * | 12/2005 | Staveley et al. | 709/224 |
| 7,058,542 B2 | * | 6/2006 | Hauhia et al. | 702/183 |
| 2001/0052087 A1 | * | 12/2001 | Garg et al. | 714/37 |
| 2003/0110426 A1 | * | 6/2003 | Faust et al. | 714/723 |
| 2003/0154262 A1 | * | 8/2003 | Kaiser et al. | 709/219 |

\* cited by examiner

*Primary Examiner*—Wen-Tai Lin
(74) *Attorney, Agent, or Firm*—Townsend and Townsend and Crew LLP

(57) ABSTRACT

A system for tracking modules in a network includes a service history recording arrangement associated with a module. The arrangement is configured to store data relating to the module. The system further includes a data storage arrangement configured to store data relating to the module. The system also includes a network monitoring arrangement configured to read information from or write information to the service history recording arrangement and to read information from or write information to the data storage arrangement. The system also includes a processor configured to receive and process data from the data storage arrangement and thereby produce analyzed network information. The service history recording arrangement may be integral to the module. The service history recording arrangement may include nonvolatile memory. Modules that include a service history recording arrangement are also provided. Associated methods are also provided.

14 Claims, 3 Drawing Sheets

AUTOMATED MODULE TRACKING SYSTEM FOR COMMUNICATIONS NETWORKS

CROSS-REFERENCE TO RELATED APPLICATIONS

This application is related to the following commonly assigned and concurrently filed patent application:

U.S. patent application Ser. No. 10/096,024, entitled "Systems and Methods for Tracking the Reliability of Communications Networks," by Jon G. Vaver.

BACKGROUND OF THE INVENTION

The present invention relates generally to systems for tracking and evaluating the service history of electronic network components. The present invention relates more specifically to systems for tracking the history of network modules through the use of memory elements associated with the modules and using the information to evaluate the reliability of the modules and the network as a whole.

Computer and telecommunication networks are ubiquitous in modern society. From emails within a small office to international telephone calls, nearly every form of electronic communication depends on some form of electronic network. With the dependence comes a need for greater reliability.

Networks include many components, or modules, that in one way or another facilitate the transmission of signals. Thus, the reliability of the network is a function of the reliability of the individual network modules. Therefore, to provide progressively more reliable electronic networks, systems are needed that more rigorously gather and analyze data associated with network modules. However, network modules may be distributed across vast geographic distances, making the tasks of gathering, tracking, and monitoring module data difficult.

Among other things, the present invention provides systems and methods that monitor the service history of network modules. Furthermore, the present invention provides the service history irrespective of the geographic distribution of the network. The present invention also provides reliability analyses tools that analyze service history data to evaluate network and module reliability.

BRIEF SUMMARY OF THE INVENTION

The present invention provides a system for tracking modules in a network. The system includes a service history recording arrangement associated with a module. The arrangement is configured to store data relating to the module. The system also includes a data storage arrangement configured to store data relating to the module. A network monitoring arrangement is configured to read information from or write information to the service history recording arrangement and to read information from or write information to the data storage arrangement. A processor is configured to receive and process data from the data storage arrangement and thereby produce analyzed information associated with the network.

The service history recording arrangement is integral to the module in one embodiment. The service history recording arrangement may include nonvolatile memory, which may be static random access memory (SRAM), electrically erasable programmable read only memory (EEPROM), a combination of SRAM and EEPROM, Flash random access memory (Flash RAM), or ferroelectric nonvolatile random access memory (FRAM). In another embodiment, the data storage arrangement includes a database that stores information relating to more than one network module.

The system may include a field tool for reading information from and writing information to a service history recording arrangement associated with a module apart from the network.

The present invention also provides a network module having a service history recording arrangement. The arrangement is configured to record information relating to the module. The arrangement includes a nonvolatile memory element that stores the information.

The module may be a transmitter, a receiver, a power supply, a controller and a relay a splitter, a tuner, an amplifier, a pump, a filter, a multiplexer, a gain equalizer, a dispersion equalizer, a CPU, a control processor, or a shelf processor. The nonvolatile memory element may be static random access memory (SRAM), electrically erasable programmable read only memory (EEPROM), a combination of SRAM and EEPROM, Flash random access memory (Flash RAM), or ferroelectric nonvolatile random access memory (FRAM). The history recording arrangement may be configured to provide information to and receive information from a network monitoring arrangement. The service history recording arrangement also may be configured to provide information to and receive information from a field tool.

The present invention also provides a field tool. The field tool includes a memory element that stores information relating to network modules. The field tool also includes an arrangement that reads information from a service history recording arrangement associated with a module and stores the information in the memory element. The arrangement also writes information from the memory element to the history recording arrangement associated with a network module.

The present invention also provides a method for tracking the service history of modules in a network. The method includes recording module service history information on an arrangement associated with each module. The information is then transmitted and stored on a data storage arrangement. The information is processed to produce analyzed information associated with the network.

The present invention also provides a method of using a field tool to track modules in a network, in inventory, and in repair. The method includes connecting the field tool to a module and reading information from or writing information to a memory device associated with the module.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Figure 1:
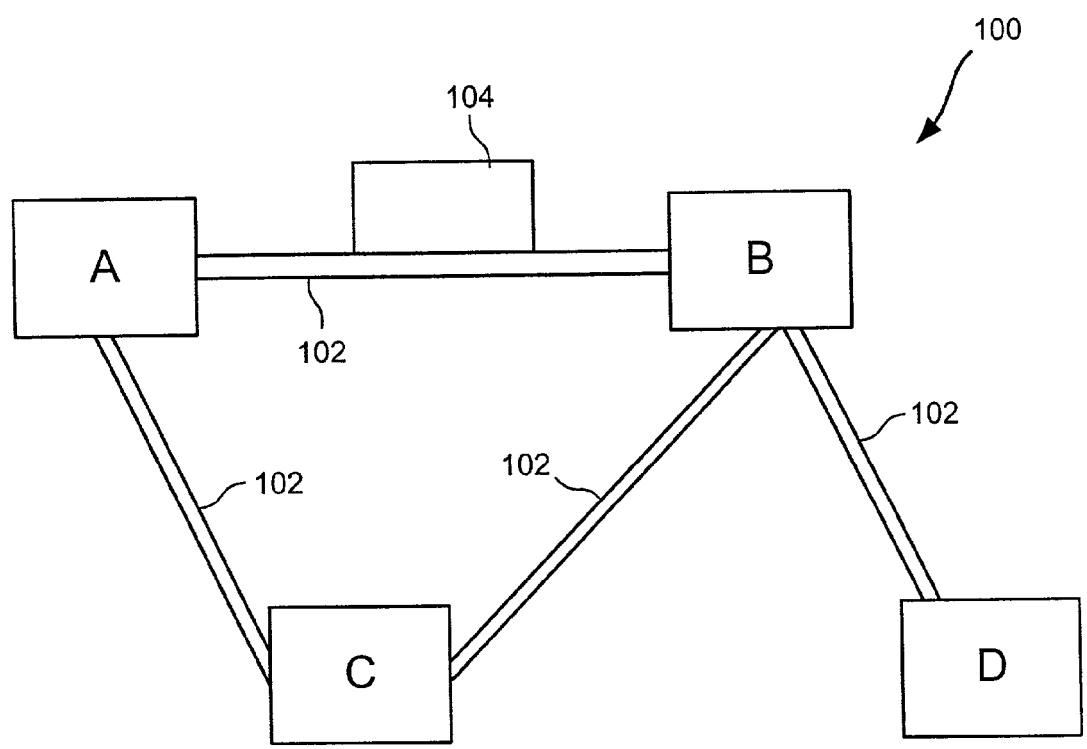
FIG. 1 illustrates an embodiment of a network in accordance with the present invention, which may include modules whose service history is tracked according to the present invention.

The present invention provides systems and methods for gathering and analyzing data relating to the service history of modules within a network, electronic, optical, or other. Networks are well known. The Internet is one example of an electronic network. Other examples include local area networks (LANs), wide area networks (WANs), long-haul transmission networks and the like, all of which may benefit from the present invention.

Networks consist of a collection of nodes interconnected by transmission links. The transmission links may be any means for transmitting electronic signals, including fiber optic cable, copper wiring, microwave signals, satellite up- and down-links and the like. Networks also include relay stations along transmission links for receiving and retransmitting signals, in order to, for example, increase a signal's strength. At network nodes, signals may be added to the network. Such signals may be new signals or signals transferred from other networks. Signals may also be removed from the network if the node is the signal's destination. Signals may also be redirected to other networks for further routing to their destinations. Along transmission links, signals may be monitored for any number of reasons, such as to monitor the status of the network.

At nodes, relay stations and monitoring sites, many components, or modules, cooperate to perform various network functions. According to one embodiment of the present invention, modules include any electronic equipment responsible for a function associated with the network. In another embodiment, modules include individual replaceable units of electronic equipment. For example, modules may include power supplies, transmitters, receivers, relays and the like. Herein, modules will refer to any network equipment for which reliability data is maintained.

Networks are only useful when they function properly. "Reliability" generally refers to the frequency with which a network fulfills its intended function of successfully transporting a signal from an origin to a destination on the network. Because networks often carry important signals, reliability is a key network factor. Reliability is also a key factor in determining network operating costs.

Typically, only the smallest of networks are dedicated to single users. Networks are often owned by large telecommunications companies, and paths—circuits or wavelengths—are leased or sold to individual users. Users expect that their paths will be available when they want them. Thus, network owners are pressured to provide highly reliable services to their users. Further, even large, single-user-dedicated networks require high reliability. After all, if a single user is willing to incur the expense of creating and maintaining a dedicated network, the user likely intends for the network to be highly reliable. In short, reliability is important to both owners and users of networks.

The reliability of any system is a function of the reliability of individual components of the system. Networks are no different. Whether a network path is considered reliable depends on the transmitters, receivers, relays, power supplies and other modules that cooperate to transmit a signal through the network. Thus, network owners, operators and users desire highly reliable network modules.

The science of reliability is well known. In general, future reliability predictions may be based on past experience. More accurate reliability prediction is one benefit of observation, which includes the comparison of predicted, or advertised, failure rates with observed failure rates (and therefore could be used to verify contractual agreements between network suppliers and operators). Observation also facilitates the identification of changes (e.g., module design, network design, methods of testing) that could improve reliability and lower the cost of network ownership. Thus, in order to provide highly accurate reliability information to those interested in reliability, as much data as reasonably possible needs to be collected. In general, the more important the network, the more reliability data should be collected.

The present invention greatly enhances the ability to collect and analyze reliability data for electronic networks by providing a system for tracking reliability-sensitive information at the module level. As is apparent to those skilled in the art, the present invention may apply to modules and networks of any size and geographic distribution.

Generally, at the module level, reliability is a function of many aspects of a module's service history. Service history may include the following factors: when a module was manufactured; when it was received by the customer; when it was placed into service; when it may have been repaired in the field; when it may have been returned to the manufacturer for repair; when it may have been returned by the manufacturer; when new software or hardware modification may have been made to the module; the conditions under which the module operated; the demand placed on the module; module testing (pre-deployment or otherwise); when it may have been placed in or removed from inventory; and when it may have been relocated within the network. Those skilled in the art will recognize other metrics to monitor. Heretofore, systems have not existed for accurately and continuously tracking, collecting and analyzing such detailed information.

The present invention provides a system for more rigorously collecting and analyzing module-level service history data, in order to better evaluate and predict the reliability of the network within which the modules operate, verify module reliability performance, and identify modules with chronic problems. The present invention accomplishes this by associating a memory element with a module. In some embodiments, the memory element is most appropriately nonvolatile memory physically connected to the module. In other embodiments, the memory element is not physically connected to the module. A network management system, or network monitoring arrangement, may access the memory element by writing to or reading from the memory element when the module is incorporated into the network. Additionally, a field tool, such as may be carried by a technician, may access the memory element by reading from and writing to the memory element when the module is either in the network or removed from the network, such as, for example, when the module is in inventory.

The information written to and read from the memory element includes service history data related to the module. For example, the memory element may include the manufacture data of the module, the date the module was placed into service, the date and type of any maintenance performed on the module and the like. Thus, the memory element functions as a service history recording arrangement for the associated module.

Ideally, the service history recording arrangement remains associated with the same module for the module's life, and either automated systems or maintenance procedures ensure that the service history data remains current. For instance, if the service history recording arrangement is not part of the module when the module is received from the manufacturer, the two are coupled soon thereafter, and appropriate information is entered into the recording arrangement. While the module is in inventory, periodically executed maintenance procedures review the status of the module by reading information from and writing information to the recording arrangement through the use of the field tool, for example. If software or hardware modifications are made to the module while in inventory, appropriate information is entered into the service history recording arrangement. Once the module is placed into service, the network management system may automatically write certain information to the recording arrangement. During the service life of the module, any information pertinent to the reliability of the module may be recorded by the recording arrangement. For example, if the module ever fails, the repair history may be entered into the recording arrangement, even if the module is returned to the manufacturer for repair.

The ability to track the service history of modules returned to the manufacturer for repair is one of the more significant benefits provided by the present invention. It is occasionally the case that the same module is repeatedly returned to the manufacturer or independent repair facility for intermittent failures, only to have the manufacturer return the item to the customer having found no failure and having accomplished no repair. It is further the case that such modules may continue to experience the same kinds of failures, yet go unidentified as having had such a failure previously. Thus, the same module continues to negatively impact the reliability of the network. In light of the present invention, it becomes possible to identify such a module and remove it from inventory before the module becomes a serious network reliability detractor.

The network management system and the field tool provide service history information relating to modules in the network to a module history database. The module history database collects and maintains service history data from as many modules in the network for which service history data is desired to be maintained. Thus, over time, the module history database records a substantial volume of module service history data that may be analyzed and used to predict future network reliability information.

The present invention also includes a reliability monitoring tool that interacts with the module history database to perform reliability analyses either in response to user or automated instructions. As stated previously, the science of reliability analysis is well known. However, the present invention provides a tremendous advancement in the ability to evaluate and predict reliability factors for electronic networks by more completely tracking the service history of network modules. For example, according to the present invention, the reliability monitoring tool may perform analyses on classes of modules, specific types of modules, module manufacturers, the locations of modules within the network, the conditions under which the modules were operated in the network and the like. Heretofore, such detailed information was unavailable.

The present invention also makes the reliability and service history data available through a web-based interface. Thus, network operators, owners and users can, depending on their level of access, obtain such information practically anywhere in the world. Even network module manufacturers could have access to the information, which would help the manufacturers to design and produce better network modules.

The availability of more accurate and extensive network reliability information based on module service history allows network owners and users to better utilize the network resources. For example, network owners or operators are better able to predict the time to failure of certain modules. Thus, inventory items can be maintained at more efficient levels. Users benefit by having more reliable network resources, which enables users to contract for network services at more efficient usage rates. Many other benefits are provided by the present invention, which are apparent to those skilled in the art in light of the disclosure herein. Additional systems and methods for obtaining network reliability information are provided in copending, commonly assigned and concurrently filed U.S. patent application Ser. No. 10/096,024, entitled "SYSTEMS AND METHODS FOR TRACKING THE RELIABILITY OF COMMUNICATIONS NETWORKS," which application is incorporated herein by reference in its entirety.

Having described the present invention generally, a more specific description will be provided herein and in the included figures. Attention is first directed to FIG. 1, which illustrates an electronic network 100 according to the present invention. The network 100 may be the Internet, a LAN, a WAN or any other network arrangement configured to transport signals from one point on the network to another. The network 100 includes transmission links 102 that actually carry the signals, and nodes A, B, C and D at which signals may be originated, terminated, relayed or redirected. The transmission links 102 may include copper wire, fiber optic cable, microwave signals, satellite links or the like. The network 100 also includes a monitoring site 104 that monitors signals along a transmission link.

Figure 2:
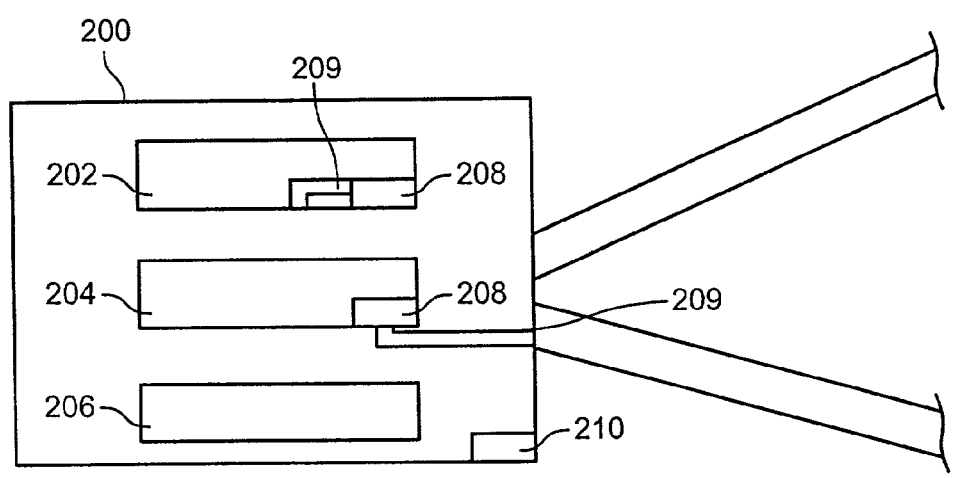
FIG. 2 illustrates an embodiment of a network node in accordance with the present invention, which may include modules whose service history is tracked according to the present invention.

Attention is directed to FIG. 2, which illustrates a node 200 in greater detail. As those skilled in the art will appreciate, a monitoring site or relay station would have a similar function to the node illustrated herein as it relates to the network modules. The node 200 includes modules 202, 204 and 206. The modules may be transmitters, receivers, power supplies, controllers, relays or the like. The modules include a service history recording arrangement 208. In this example, the recording arrangement 208 is a memory element for recording information related to the service history of the module. Ideally, the recording arrangement 208 includes nonvolatile memory from which data may be read and to which data may be written. For example, the recording arrangement may include, for example, static random access memory (SRAM), electrically erasable programmable read only memory (EEPROM), a combination of SRAM and EEPROM, Flash random access memory (Flash RAM), or ferroelectric nonvolatile random access memory (FRAM). Further, the service history recording arrangement may include one or more interfaces 209 for providing an electrical connection to a module 208 or to the network 100. An associated memory addressing scheme may be used to facilitate the storage of service history data. Although pictured as being integral to the module, it is not necessary that the recording arrangement 208 be so configured. For example, a second recording arrangement 210, associated with module 206, is shown as being located elsewhere in the node 200. In yet another embodiment, a recording arrangement could be located apart from the node 200.

The recording arrangements 208 are configured to accept and store electronic signals representing data related to the service history of a module with which a recording arrangement is associated. Examples of service history data include:

permanent module identification number; initial release date for the module; the field history of the module, including the insertion time, the removal time and the reason for removal; and any modifications or upgrades performed on the module. To facilitate the recording of data in the recording arrangement, the data may include codes. For instance, "reason for removal" codes may include a code for different failure types, including "unknown", "no trouble found" and "evaluation pending".

As will be explained in more detail hereinafter, the service history on the recording arrangement is accessible by a network management system. The information is also accessible through the use of a field tool. The information may be updated periodically and automatically by the network management system, or the data may be accessed and modified manually through the field tool or other user interface.

Figure 3:
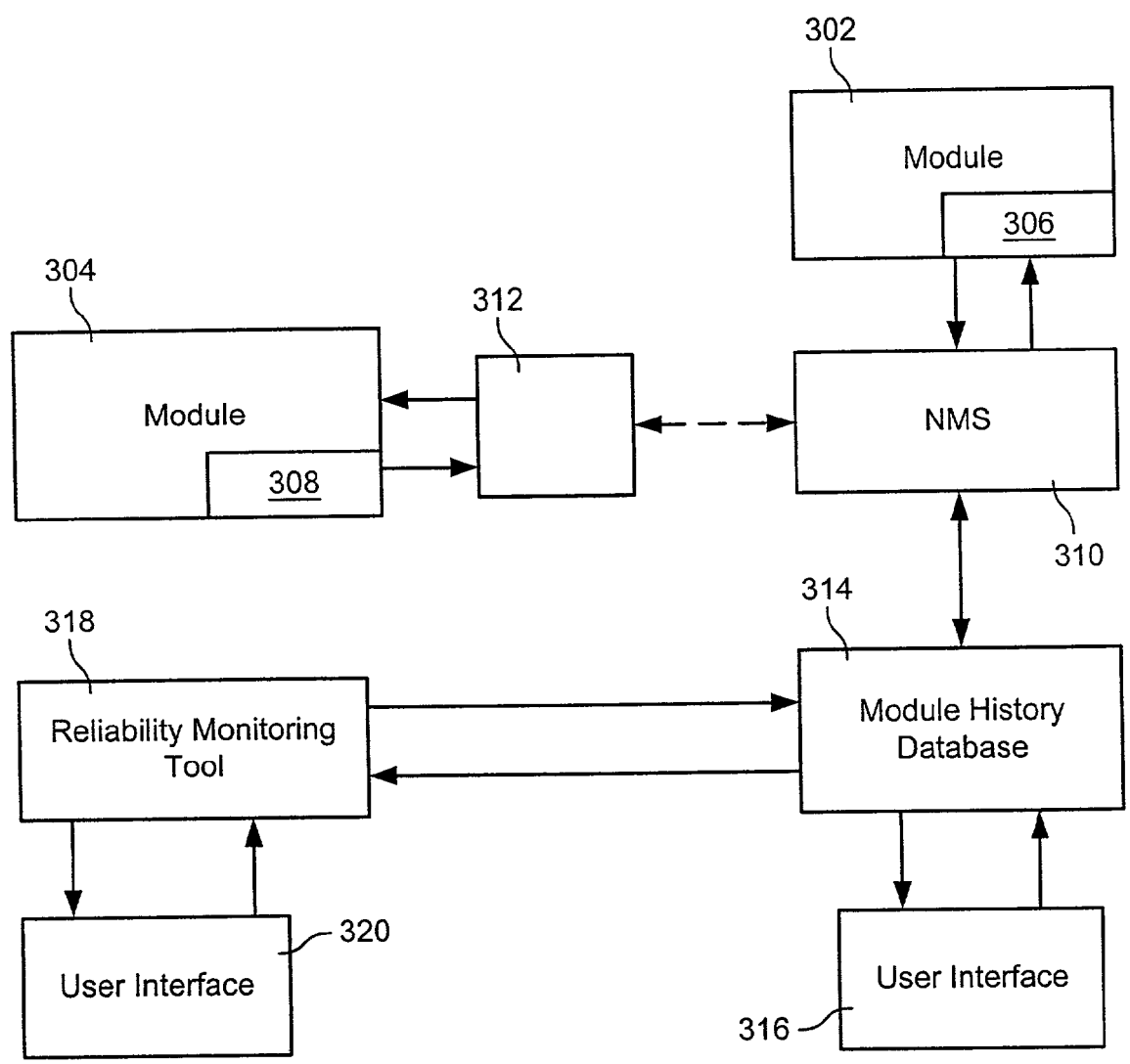
FIG. 3 illustrates an embodiment of a system for tracking the service history of network modules according to the present invention.

FIG. 3 illustrates a module tracking system 300 according to the present invention. The system 300 includes a first module 302 and a second module 304. According to this example of the present invention, the module 302 is installed in a network, while the module 304 is not located in the network. For instance, the module 304 may be located in an inventory storage location. Each module includes a service history recording arrangement 306, 308. The system 300 also includes a network management system 310 (also referred to as a network monitoring system), which performs a number of network functions well known to those skilled in the art. In addition to the well known functions, the network management system 310 also performs a number of additional functions according to the present invention. For example, as stated previously, the network management system 310 reads service history information from and writes service history information to the history recording arrangements 306, 308.

Because the module 302 is installed in a network, the network management system 310 may access the recording arrangement 306 directly. However, the module 304 is not installed in a network. Therefore, the network management system 310 accesses the recording arrangement 308 through a field tool 312.

The network management system 310 interacts with a module history database 314 that stores service history information relating to modules throughout the network, including spare parts in inventory. The module history database may be any one or a combination of well known data storage arrangements. For example, the module history database may be a server computer or other computing device with associated magnetic, optical, solid state or other storage medium. The network management system 310 periodically compares the service history recorded by the recording arrangement associated with each module in the network to the information stored in the module history database. Thus, at any time, information relating to the current state and history of all modules that are or have been in the network is available.

The information stored in the module history database is available to users in any number of ways. First, the information may be accessed through a user interface 316 directly associated with the module history database 314. The user interface 316 may be a computer terminal directly connected to the module history database 314, of the user interface 316 may be a computer located across a network from the module history database 314. Many other examples are possible.

Alternatively, the module history database may be accessed by a user through a reliability monitoring tool 318. The reliability monitoring tool 318 accesses information from the module history database 314 and presents real-time status information to users. Additionally, the reliability monitoring tool 318 calculates and provides reliability statistics for modules in the network. The information may be accessed through a user interface 320 connected directly to the reliability monitoring tool 318, or the user interface 320 may be located across a network from the reliability monitoring tool 318.

Examples of information that may be provided by the reliability monitoring tool 318 include: distribution of times for failed module to return to inventory; distribution of times for each type of module to fail; distribution of times for modules to remain in inventory; distribution of "ages" for modules in the network; frequency of failure modes for each module type; distribution of module upgrades; and the like.

Although pictured as being many separate components, it is not necessary for the network management system 310, the module history database 314, the reliability monitoring tool 318 and the user interfaces 316, 320 to be different components. For example, these elements could exist as a single personal computer attached to a network.

Figure 4:
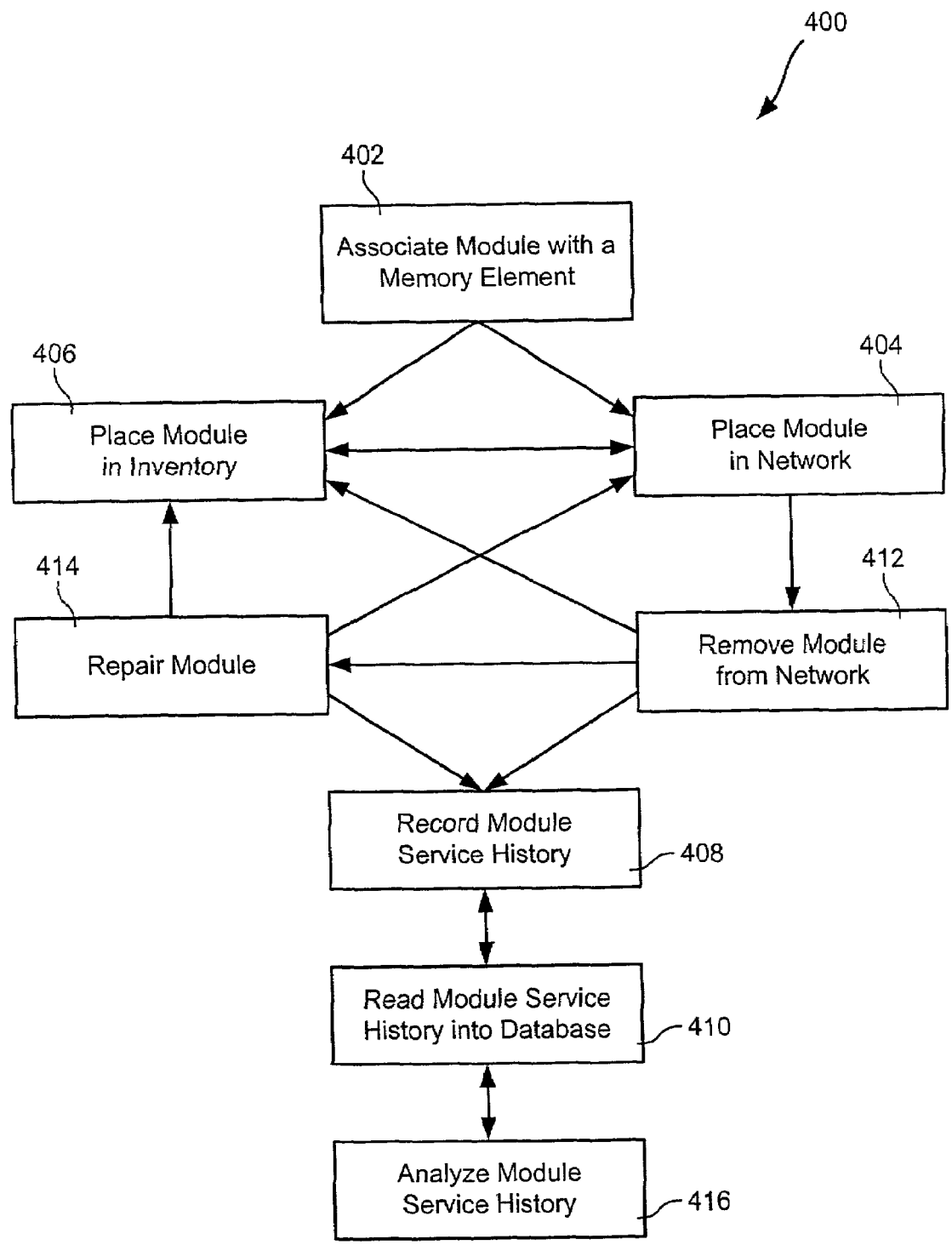
FIG. 4 illustrates an embodiment of a method of tracking the service history of network modules according to the present invention.

Attention is now directed to FIG. 4, which illustrates a method 400 of tracking the service history of network modules according to the present invention. The method may be performed using the system of FIG. 3. At operation 402, a network module is associated with a memory element that functions as the service history recording arrangement. The module is either placed into a network at operation 404, or placed into inventory at operation 406. In either case, information relating to the service history of the module may be recorded on the memory element at operation 408. If the module is in inventory, the service history may be recorded or updated through the use of a field tool.

The service history information is periodically read into the module history database at operation 410. During the service life of the module, the module may be removed from the network for a variety of reasons, including failure, at operation 412. The module may be placed into inventory at operation 406 or repaired at operation 414 before being placed back into the network (operation 404) or inventory (operation 406). In all cases, information may be recorded on the memory element at operation 408.

At operation 416, the module service history may be analyzed. The analysis may include checking the current service status of modules in the network. Alternatively, the analysis may include calculating reliability statistics of modules based on the service history.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A system for tracking reliability data for each of a plurality of modules in a network, comprising:
    a plurality of service history recording arrangements, wherein:
        each service history recording arrangement is associated with a module, and each service history recording arrangement is configured to store data relating to its associated module;
    a data storage arrangement configured to acquire and store data relating to each of the plurality of modules;
    a network monitoring arrangement configured to access each of the service history recording arrangements and to access the data storage arrangement;
    a field tool configured to read and write data to and from a selected service history recording arrangement when the selected service history recording arrangement and its associated module are disconnected from the network; and a processor configured to:
receive data from the data storage arrangement, and
process the data to produce reliability statistics by performing analyses on the plurality of modules based on classes, specific types, manufacturers, locations, and operation conditions of the plurality of modules in the network, and using the information recorded on the plurality of service history recording arrangements, wherein the reliability statistics comprise at least one selection from a group of reliability statistical categories consisting of:
a distribution of times for failed modules to return to inventory,
a distribution of times for each type of module to fail,
a distribution of times for modules to remain in inventory,
a distribution of ages for modules in the network,
frequency of failure modes for each module type, and
a distribution of module upgrades.

2. The system as recited in claim 1, wherein the service history recording arrangement is integral to the module.

3. The system as recited in claim 1, wherein the service history recording arrangement includes nonvolatile memory.

4. The system as recited in claim 3, wherein the nonvolatile memory is selected from the group consisting of static random access memory (SRAM), electrically erasable programmable read only memory (EEPROM), a combination of SRAM and EEPROM, Flash random access memory (Flash RAM), or ferroelectric nonvolatile random access memory (FRAM).

5. The system as recite in claim 1, wherein the system includes more than one network module and wherein the data storage arrangement includes a database that stores information relating to the more than one network module.

6. The system as in claim 1, wherein reliability statistics for modules in the network are calculated from information relating to the network module comprising at least three selections from a group of data categories consisting of:
when the network modules were manufactured,
when the network modules were received by a customer,
when the network modules were placed into service,
when the network modules were repaired in the field,
when the network modules were returned by the manufacturer,
when new software modifications were made to the network modules,
when new hardware modifications were made to the network modules,
the conditions under which the network modules operated,
the demand placed on the network modules,
when the network modules were placed in inventory,
when the network modules were removed from inventory, and
when the network modules were relocated within the network.

7. The system as in claim 1, wherein the processor is configured to produce real-time status information associated with the network.

8. A method of tracking reliability data for each of a plurality of modules in a network, comprising:
recording information on a plurality of service history recording arrangements, wherein
each service history recording arrangement is associated with a module, and
each service history recording arrangement is configured to store information relating to its associated module;
causing the information to be transmitted to, received from, and stored on a data storage arrangement;
processing the information on a processor to produce reliability statistics by performing analyses on the plurality of modules based on classes, specific types, manufacturers, locations and operation conditions of the plurality of modules in the network, and using the information recorded on the plurality of service history recording arrangements; and
using a field tool to modify the information on a selected service history recording arrangement when the selected service history recording arrangement and its associated module are disconnected from a network.

9. The method as recited in claim 8, wherein the service history recording arrangement is integral to the module.

10. The method as recited in claim 9, wherein the service history recording arrangement includes nonvolatile memory.

11. The method as recited in claim 10, wherein the nonvolatile memory is selected from the group consisting of static random access memory (SRAM), electrically erasable programmable read only memory (EEPROM), a combination of SRAM and EEPROM, Flash random access memory (Flash RAM), or ferroelectric nonvolatile random access memory (FRAM).

12. The method as recited in claim 8, wherein the data storage arrangement includes a database system.

13. The method as recited in claim 8, wherein the analyzed information is made available over the Internet.

14. The method as recited in claim 8, wherein the analyzed information is made available over a private network.

* * * * *